PREPARATION OF PRINTED CIRCUITS

Filed Sept. 7, 1966 3 Sheets-Sheet 1

Inventor
Cyril V. Oliver
By Kemon Palmer Stewart & Estabrook
Attorneys

Inventor
Cyril V. Oliver
By Kemon Palmer
Stewart & Estabrook
Attorneys

PREPARATION OF PRINTED CIRCUITS

Filed Sept. 7, 1966 3 Sheets-Sheet 3

Inventor
Cyril V. Oliver
By Kemon, Palmer, Stewart & Estabrook
Attorneys

United States Patent Office 3,460,448
Patented Aug. 12, 1969

3,460,448

PREPARATION OF PRINTED CIRCUITS

Cyril Victor Oliver, Stevenage, England, assignor to British Aircraft Corporation Limited, London, England, a British company Filed Sept. 7, 1966, Ser. No. 577,691
Claims priority, application Great Britain, Sept. 13, 1965, 38,950/65
Int. Cl. H05k 3/00; G03b 27/32
U.S. Cl. 95—1 4 Claims

ABSTRACT OF THE DISCLOSURE

A method and apparatus is disclosed for preparing master prints from circuit diagrams in which data corresponding to the position and character of each element of the tracks is first recorded on a record strip. Silhouettes of the track elements are then arranged in a carrier in an optical system so that a light source passing therethrough impinges on a light sensitive film or plate. The record strip is then advanced step by step and the data for each track element is sensed to generate corresponding electrical signals. Silhouettes are then successively selected in accordance with such signals and exposed onto the light sensitive film or plate. Between exposures, the optical system and light sensitive film or plate are moved relatively in one or both of two mutually perpendicular directions in accordance with the electrical signals to position the film or plate for the next exposure. The master print is then obtained by developing the light sensitive film or plate.

In the manufacture of printed circuits the continuing reduction in size of electronic components is making the process of converting a designer's original circuit diagram to a finely drawn accurate master print increasingly difficult, and therefore more time consuming. In one known system the original circuit sketched by the designer is reproduced by a draughtsman in an enlarged form with tracks, bends and pads drawn to within very fine tolerances. A condensed image of the draughtsman's reproduction is then photographed and the film developed to produce a master print suitable for use in applying a photo-resist to a copper coated printed circuit board.

According to the present invention, the master prints are obtained by recording data corresponding to the position and character of each element of the tracks in the original circuit diagram on a record strip, arranging silhouettes of required track elements in a carrier in an optical system and arranging a light sensitive film or plate in the exposure plane of the optical system, advancing the record strip step by step and sensing the data for each track element in turn to generate corresponding electrical signals, selecting silhouettes one after another in accordance with the electric signals and exposing each selected silhouette onto the film or plate, and between exposures relatively moving the optical system and the film or plate in one or both of two mutually perpendicular directions in accordance with the electric signals to position the film or plate for the next exposure. Thus a reproduction of the original circuit is built up step by step on the film or plate, and the required master print is obtained by developing the film or plate.

Thus the invention enables the direct transference of an original sketch to a fixed master print without the need for the intermediate step of preparing a finely drawn copy. It also has the advantage that a tape of a particular circuit can be easily stored and printed again or used in a new sequence where it forms part of a larger circuit, while the use of silhouettes enables a high degree of accuracy to be achieved.

The programmed data is normally fed to a control circuit which selects the required silhouette and permits an exposure flash only after the relative positioning of the film or plate and the optical system has taken place, such that a silhouette is exposed in its correct position.

Individual silhouettes can be placed in the carrier as required but preferably the carrier holds a complete range. In the latter case the silhouettes may be individually illuminated from separate light sources or alternatively a single light source is employed which distributes illumination evenly over the whole range and an individual silhouette is exposed by masking the light passing through the remaining silhouettes. The silhouettes are conveniently arranged in a circle around the carrier. A glass prism unit is then arranged to rotate beneath the carrier and light is reflected through the unit such that it emerges parallel to its incident path and along the axis of rotation towards the film or plate. Thus light from any selected silhouette always emerges along the same path, and the co-ordinate table need therefore only be moved with respect to this path. At the same time this provides a method of selecting the required silhouette when a single light source is employed by timing the exposure flash to coincide with the prism being located under the required silhouette. Alternatively with each silhouette individually illuminated, the selection simply comprises switching on the required lamp.

One example of the invention will now be described with reference to the accompanying drawings in which.

Figures 1, 2, 5:
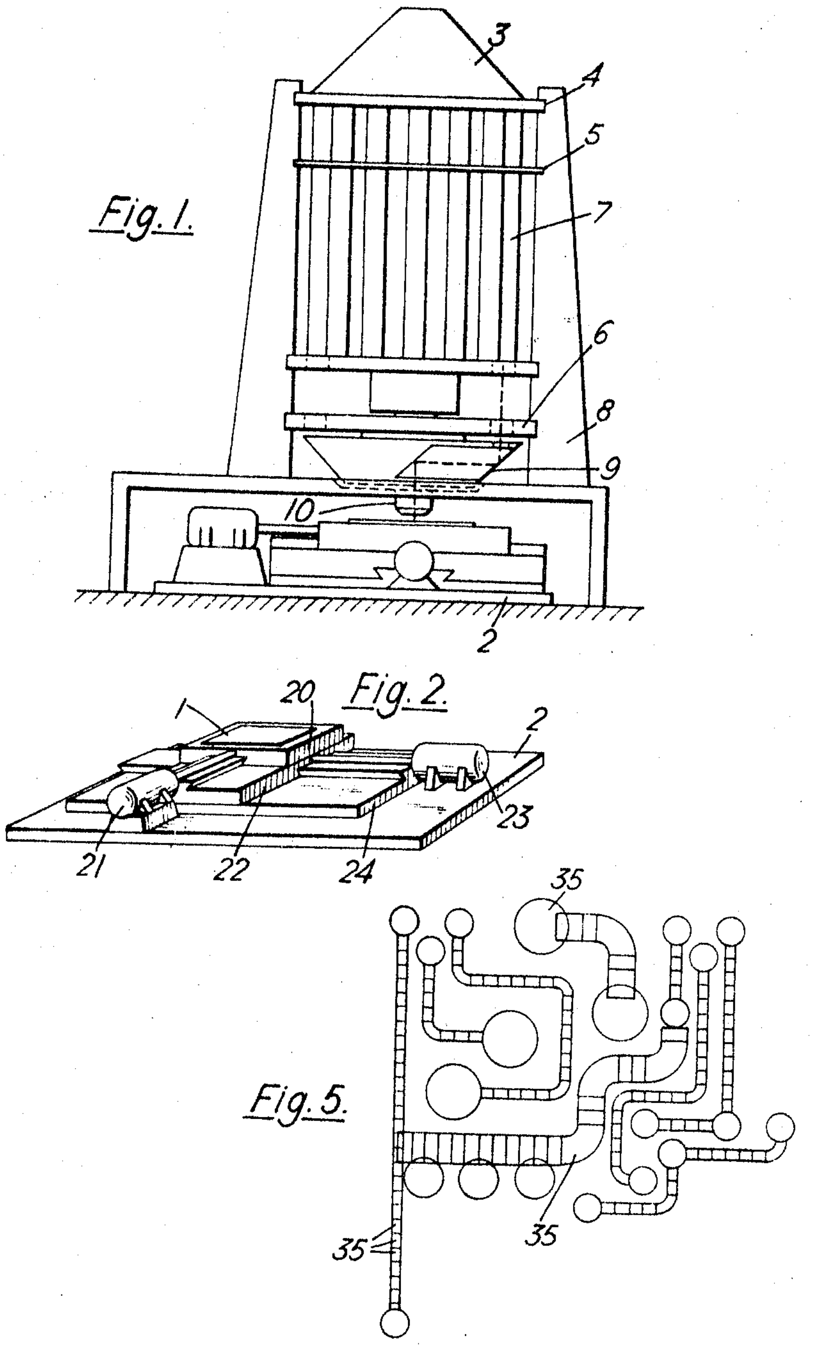
FIGURE 1 is a schematic representation of a photocomposing apparatus.
FIGURE 2 is a perspective view of the co-ordinate table used in the apparatus of FIGURE 1.
FIGURE 5 is a schematic representation of a circuit composed with the apparatus of FIGURE 1.

Referring to FIGURES 1 and 2, a film 1 which is to be exposed is placed on a co-ordinate table 2. The optical system commences with a lamp (not shown) located at the centre of an annular prism 3 which evenly distributes light from the lamp around the periphery of a plate 4 on which the prism rests. The light is reflected downwards through circular holes in the plate, each of which holds a condenser lens, and falls on a carrier plate 5 having corresponding holes in which are mounted silhouettes of the track elements. Beneath this plate is a further plate 6 containing collimation lenses and the light paths between the condensing lenses and the collimating lenses are enclosed by tubular masks 7 to reduce the effect of stray light. The three plates are fixed relative to one another in a frame 8.

Figure 3:
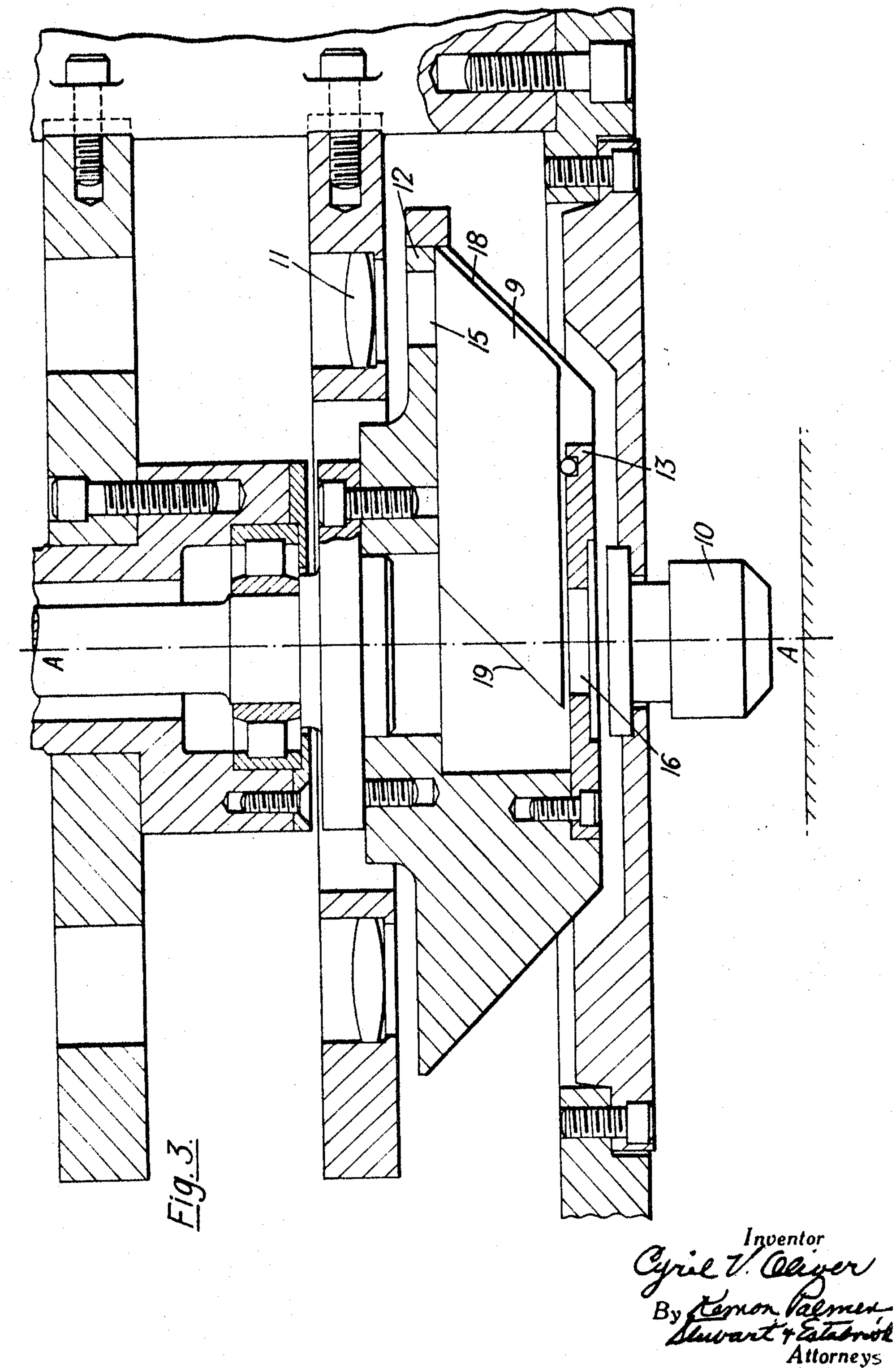
FIGURE 3 is a sectional view through a portion of the apparatus of FIGURE 1.

The remainder of the optical system comprises a prism unit 9 and an objective lens 10 and is shown in more detail in FIGURE 3. The prism rotates about the axis A—A and is shown passing under a collimation lens 11.

The prism is held in an assembly including an upper plate 12 and a lower plate 13 which rotate with respect to the plate 14 containing the objective lens 10. The upper plate includes a hole 15 permitting light incident from the collimation lens to pass through the prism unit. The prism unit is cut such that the light incident from the collimation lens falls on the face 18 at an angle of 45° and is internally reflected through 90° along the longitudinal axis of the prism. It then strikes the second face 19 at a point where this face intercepts the axis A—A, is again internally reflected through 90° and emerges downwards along the axis A—A. The emergent rays pass through a hole 16 in the lower plate and through the objective lens 10 onto the film 1. Since the emergent optical axis of the prism unit lies on the axis A—A an exposure flash through a selected silhouette at any point in the revolution of the prism unit results in a light beam along this axis.

The co-ordinate table 2 is shown in more detail in FIGURE 2. The film is located in a holder 20 which is mounted on a slide forming part of a block 22 and can be moved along the slide in small steps in the Y direction by the motor 21. The block 22 is in turn mounted on a slide which is perpendicular to the first slide and which forms part of a fixed block 24. The block 22 can be moved in similar steps in the X direction by the motor 23. The figure shows a straightforward motor drive for simplicity but in practice a Geneva type drive mechanism is used.

To ensure that a correct reproduction of the original circuit is built up step by step on the film, the exposure of the selected silhouettes must be alternated with the positioning of the co-ordinate table. With the optical system described in this example all silhouettes are illuminated simultaneously during an exposure flash. The process of selection therefore comprises timing the exposure flash to occur when the rotating prism lies beneath the collimation lens corresponding to the required silhouette. After an exposure the co-ordinate table must be moved to a new position before the next exposure occurs.

Figure 4:
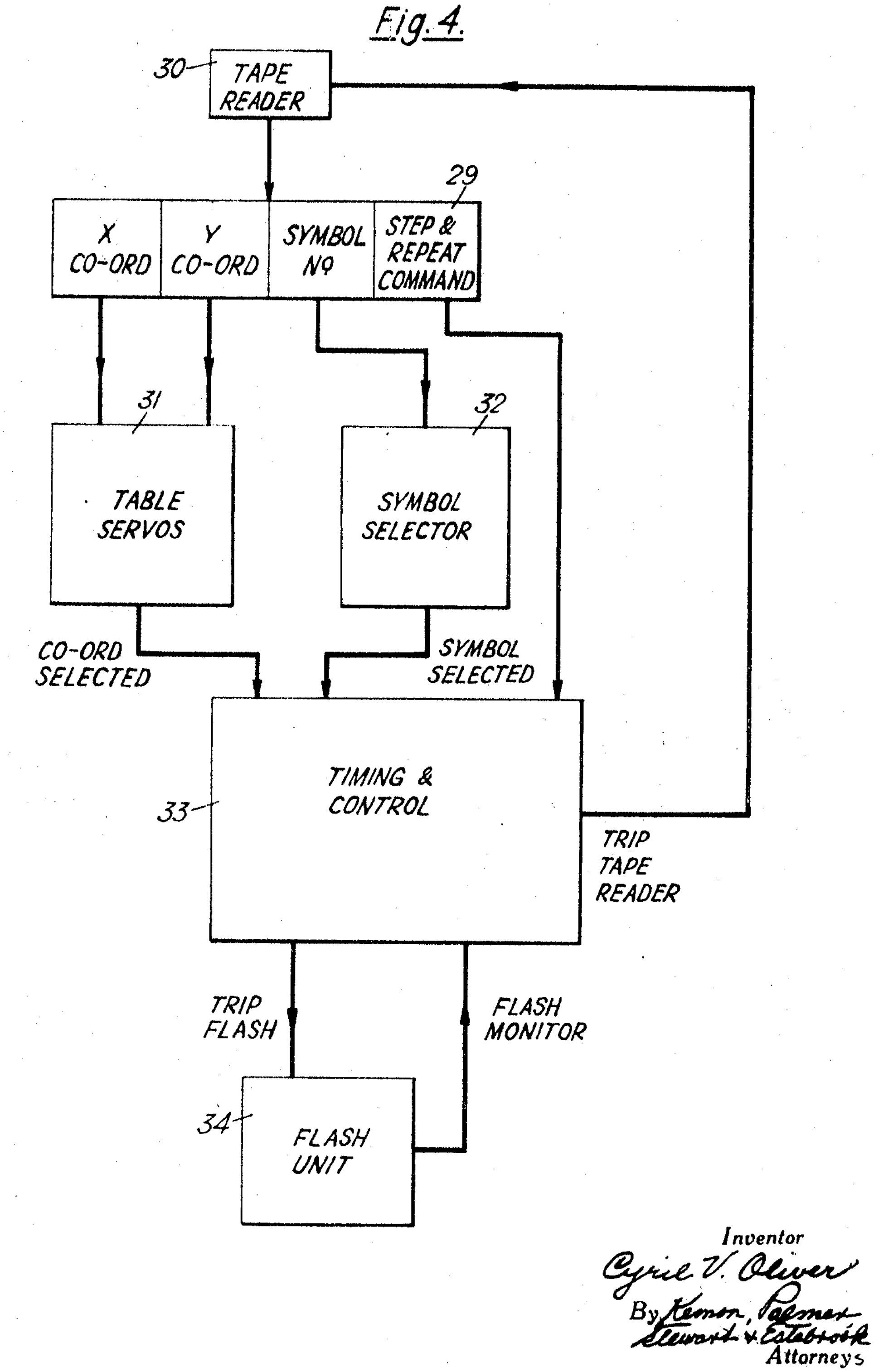
FIGURE 4 is a block circuit diagram of a control circuit for use with the apparatus of FIGURE 1.

The operation of the whole process is controlled using the circuit shown in FIGURE 4. The original circuit is converted into data recorded on a tape, the data including information concerning the type of track elements required and the position they should occupy in an X, Y co-ordinate system.

The tape reader 30 applies corresponding electric signals for each element in turn to a memory 29 which separately stores the X and Y positional data, the track element required and the step and repeat command. The positional data is fed as separate X, Y co-ordinates to co-ordinate table servo mechanisms 31. The track elements are accorded symbol numbers and the corresponding signals are fed to the symbol selector 32. The timing and control circuit 33 receives a confirmatory signal from the co-ordinate table to indicate that the required co-ordinate position has been achieved. The symbol selector circuit receives data representing at any moment the instantaneous angular position of the prism unit. When the prism unit is in a position corresponding to the location of the required silhouette a further confirmatory signal is sent from the symbol selector to the control circuit. Once the film holder has been positioned, the next signal from the symbol selector will cause the control circuit to generate a triggering signal for a flash unit 34 to cause exposure of the selected silhouette on to the selected film position. A confirmatory flash monitor signal indicates to the control circuit that the exposure has been made.

The step-and-repeat facility will now be described. Consider the tape reader to have read a command containing the co-ordinates $X_1Y_1$ and the symbol $S_1$ with the result that the symbol $S_1$ has been printed at $X_1Y_1$. The next command may have co-ordinates $X_2Y_2$ and a symbol $S_2$. The signal to the table servos depends on the difference between $X_1$ and $X_2$ and between $Y_1$ and $Y_2$. If a difference exists the table will move one step in either or both directions and the symbol $S_2$ will be printed in the new position. $X_2$ and $Y_2$ are then compared with the new co-ordinates and if a difference still exists the step and repeat command then repeats the process. $S_2$ continues to be printed each time the table moves one step until the differences $X_2–X_1$ and $Y_1–Y_2$ are both reduced to zero, when the control circuit steps the tape reader to advance the tape to read the next line of data.

Thus the circuit is built up as shown in FIGURE 5. The elements 35 making up the tracks correspond to the individual silhouettes. Since the co-ordinate table is moved in fixed steps the elements will be of equal length, but overlapping sufficiently to produce a continuous track on the film.

In an alternative system, the silhouette carrier can be rotated and the prism kept stationary. Only a single condensing lens and a single collimating lens are then required.

I claim:

1. A method of preparing a master print from an original circuit diagram comprising:

- recording data corresponding to the position and character of each element of a track in said original diagram on a record strip;
- advancing said record strip step by step to generate electric signals corresponding to said data;
- mounting silhouettes of required track elements in a circular array around a carrier in an optical system;
- arranging a light sensitive surface in the exposure plane of said optical system;
- rotating a prism about an axis passing through the center of said circular array such that said prism passes in turn beneath each silhouette and each silhouette is thereby presented to a fixed point in said exposure plane;
- timing an exposure flash in accordance with said electric signals to coincide with said prism lying beneath the silhouette of a track element represented by said electric signals;
- and between exposures relatively moving said optical system and said surface in at least one of two mutually perpendicular directions to position said surface for the next exposure in accordance with said electrical signals, whereby a reproduction of the original circuit is built up step by step on said surface;
- and developing said surface to obtain the required master print.

2. Apparatus for preparing master prints from an original circuit diagram comprising:

- a carrier for holding a circular array of silhouttes of required track elements;
- a light source for illuminating said array of silhouettes;
- a holder for a light sensitive surface;
- an optical system for exposing said silhouettes on to said light sensitive surface, said optical system including a prism unit having two reflecting faces rotatable about an axis passing through the center of said circular array and extending outwards so that light passing through a selected silhouette located above said prism unit is internally reflected at a first of said faces and transmitted radially along the length of said prism unit to be reflected again at the second of said faces and to emerge along said axis;
- driving means for causing relative movement between said optical system and said surface in at least one of two mutually perpendicular directions;
- position control means for actuating said driving means responsive to electric signals representing the required position on said surface of a track element to be exposed;
- further driving means for continuously rotating said prism, and means responsive to electric signals representing a required track element for timing an exposure flash to coincide with said prism lying beneath the silhouette of said required track element;
- whereby a reproduction of the original circuit is built up step by step on said surface from which the required master print is obtained.

3. Apparatus according to claim 2, including a co-ordinate table to which said holder is fixed and in which said driving means includes servo mechanisms for moving said table before exposure is initiated, in accordance with said position representing signals.

4. Apparatus according to claim 2, in which said light source comprises a lamp, an annular prism surrounding said lamp, the outer periphery of said prism extending around said circular array such that light from said lamp is transmitted through said prism on to said carrier in a substantially even distribution with respect to said silhouettes.

References Cited

UNITED STATES PATENTS 3,247,761 4/1966 Herreman et al.

NORTON ANSHER, Primary Examiner

W. A. SIVERTSON, Assistant Examiner